(12) United States Patent
Takahashi et al.

(10) Patent No.: US 7,540,782 B2
(45) Date of Patent: Jun. 2, 2009

(54) CARD CONNECTOR AND METHOD FOR PRODUCING HOUSING ASSEMBLY

(75) Inventors: Hirokazu Takahashi, Koto-ku (JP); Kazunori Takei, Koto-ku (JP); Hitoshi Kikuchi, Koto-ku (JP)

(73) Assignee: DDK, Ltd., Tokyo (JP)

( * ) Notice: Subject to any disclaimer, the term of this patent is extended or adjusted under 35 U.S.C. 154(b) by 0 days.

(21) Appl. No.: 11/746,881

(22) Filed: May 10, 2007

(65) Prior Publication Data

US 2007/0275601 A1 Nov. 29, 2007

(30) Foreign Application Priority Data

May 25, 2006 (JP) ............................. 2006-145421
Dec. 22, 2006 (JP) ............................. 2006-345308

(51) Int. Cl.
*H01R 24/00* (2006.01)

(52) U.S. Cl. ....................................... 439/630; 439/736

(58) Field of Classification Search ................. 439/630, 439/326, 131
See application file for complete search history.

(56) References Cited

U.S. PATENT DOCUMENTS 5,823,828 A * 10/1998 Bricaud et al. .............. 439/630
6,095,868 A * 8/2000 Hyland et al. ............... 439/630
6,174,188 B1 * 1/2001 Martucci ..................... 439/326
6,210,193 B1 * 4/2001 Ito et al. ...................... 439/326
6,319,036 B1 * 11/2001 Zheng et al. ................. 439/326
6,764,336 B2 * 7/2004 Ma et al. ..................... 439/604
6,869,302 B2 * 3/2005 Bricaud et al. .............. 439/326
7,112,075 B1 * 9/2006 Su .............................. 439/159
2006/0089052 A1 * 4/2006 Lu et al. ...................... 439/630

FOREIGN PATENT DOCUMENTS

JP 2003-045562 2/2003
JP 2006-115165 4/2006
JP 2006-302684 11/2006

* cited by examiner

*Primary Examiner*—Hae Moon Hyeon
(74) *Attorney, Agent, or Firm*—Baker Botts LLP

(57) ABSTRACT

A card connector into and from which a memory card is detachably inserted and removed, includes contacts adapted to contact connection portions of the memory card, and a housing for arranging and holding the contacts. Metal plates made of a metal are installed in the housing so as to extend onto both sides in the width direction of the housing. The metal plates are integrally provided with connection portions to be connected to a substrate. A tray made of a metal is provided for loading a plurality of memory cards therein, and either of both ends of the tray in its width direction is bent substantially into an L-shape, which bent portion slidably engages the metal plate. The connector achieves a reduced overall height such as less than 2.0 mm and is also superior in safety.

14 Claims, 6 Drawing Sheets

CARD CONNECTOR AND METHOD FOR PRODUCING HOUSING ASSEMBLY

This application claims priority to Japanese Application No. 2006-145,421, filed May 25, 2006 and Japanese Application No. 2006-345,308, filed Dec. 22, 2006, each of which is incorporated by reference in its entirety herein.

BACKGROUND OF THE INVENTION

This invention relates to a card connector for use in a various electric and electronic appliances such as mobile phones, personal digital assistants (PDA), printers, card readers and the like for inputting and outputting signals into and from memory cards inserted into the card connector, and to a card connector having a structure achieving a reduced overall height of the card connector and being superior in safety of operation, and more particularly to a method for producing a housing assembly consisting of contacts, metal plates and a housing integrally formed as a unitary structure.

In recent years, with the wide spread use of digital cameras and the like, memory cards in compact shape having a large memory capacity have been used. A wide variety of memory cards have also been used depending upon characteristics and the like of appliances with which the memory cards are used, for example, SD card (Secure Digital memory card, registered trademark, referred to hereinafter just as "SD card"), Memory Stick card (registered trademark, referred to hereinafter just as "MS card"), SmartMedia card (registered trademark, referred to hereinafter just as "SM card"), Compact-Flash card (registered trademark, referred to hereinafter just as "CF card"), xD card (registered trademark, referred to hereinafter just as "xD card"), Multimedia card (registered trademark, referred to hereinafter just as "MM card"), SIM card (Subscriber Identity Module card, registered trademark) and the like. Accordingly, as devices for writing and reading onto and from these various memory cards, memory card reader writers are increasingly being used in computers themselves or as peripheral devices.

Hitherto, in order to connect a memory card to an appliance, a card connector has generally been used.

Examples of card connectors are disclosed in Japanese Patent Application Opened No. 2003-45,562 (push-push type card connector, Patent Literature 1) and Japanese Patent Application No. 2005-123,252 (Patent Literature 2) and Japanese Patent Application No. 2006-115,165 (Patent Literature 3) both using a tray.

Patent Literature 1

According to the abstract of the Japanese Patent Application Opened No. 2003-45,562, this invention has an object to provide an IC card inserting and removing device into which an IC card is detachably inserted. Disclosed is an IC card inserting and removing device adapted to be incorporated in an electronic appliance, including a housing 100 and a cover 200 covering the housing 100 consisting of a frame portion 110 in the form of a substantially U-shape and a bottom surface 120 closing one side of the frame portion 110 whose opposed lengthwise frame portions 111a and 111b are formed in their inside surfaces with guide grooves 113, and contacts 130 for IC cards arranged in a bottom frame portion 111c, wherein a locking and ejecting mechanism 300 for IC cards is incorporated in one of the lengthwise frame portions 111a and 111b, thereby providing a superior card inserting and removing device which achieves miniaturization and simplification of used parts and enables an IC card to be stably held.

Incidentally, claim 1 of claims recites an IC card inserting and removing device to be incorporated in an electronic appliance, including a housing and a cover for covering the housing consisting of a frame portion in the form of a substantially U-shape and a bottom portion for reinforcing the frame portion, said frame portion having opposed lengthwise frame portions formed in their inner surfaces with guide grooves for the IC card, and contacts for IC cards arranged in a bottom frame portion perpendicularly crossing said lengthwise frame portions, wherein said device incorporates therein an IC card locking and ejecting mechanism provided on at least one of said lengthwise frame portions comprising a slider advancing and retracting in the same directions of the movements of said IC card upon its insertion and removal, pushing means for always pushing the slider toward the card inserting opening of said guide grooves for the IC card, a cam groove provided in said slider and being in the form of a substantially heart-shape, and a rockable spring pin having a free end engaging in the cam groove and the other end fixed to said bottom frame portion. Claim 2 recites the IC card inserting and removing device as claimed in claim 1, whose slider has an inclined surface portion against which a corner oblique portion of an IC card abuts. Claim 3 recites the IC card inserting and removing device as claimed in claim 1 or 2, whose slider is adapted to slidably moved along guide rods provided on said lengthwise frame portions. Claim 4 recites the IC card inserting and removing device as claimed in claim 1, 2 or 3, whose lengthwise frame portion not incorporating said IC card locking and ejecting mechanism is provided with a metal fitting having an elastic pressing piece elastically extending in the guide groove for the IC card so as to press the side face of the IC card. Claim 5 recites the IC card inserting and removing device as claimed in claim 1, 2, 3 or 4, whose part of said cover is provided with an elastic pressing piece for pressing the surface of the IC card.

Patent Literature 2

According to the abstract of the Japanese Patent Application No. 2005-123,252, the object of this invention is to provide a card connector 10 enabling a reduced overall height of the connector with a simple construction, and this object can be achieved by a card connector 10 adapted to be connected to at least two cards 60 and including contacts 14 corresponding to the number of the cards 60, a tray 16 in which at least two cards 60 can be loaded, and a housing having a fitting opening 20 for receiving the tray 16 and arranging and holding said contacts 14. As a card connector 10 adapted to be connected to four cards 60, disclosed is a card connector including contacts 14 of four kinds, a tray 16 having a card loading portion 22 into which the four cards 60 can be loaded, and a housing 12 for arranging and holding the contacts 14 of four kinds and having a fitting opening 20 for receiving the tray 16.

Incidentally, claim 1 recites a card connector being connected to at least two cards, comprising contacts corresponding to the number of said cards, a tray into which at least two cards can be loaded, and a housing having a fitting opening for receiving said tray and arranging and holding said contacts. Claim 2 recites a card connector being connected to four cards, comprising contacts of four kinds, a tray having a card loading portion into which the four cards can be loaded, and a housing for arranging and holding said contacts of four kinds and having a fitting opening for receiving said tray. Claim 3 recites the card connector as claimed in claim 1 or 2, wherein said tray is provided with the card loading portion having one part overlapping in relation to kinds of card other than one kind of card intended to be loaded in the card loading portion so as to allow the intended one kind of card only to be loaded in the card loading portion. Claim 4 recites the card connector as claimed in claim 1 or 2, wherein said tray is provided with the card loading portion not having a part overlapping in relation to at least two kinds of cards so as to allow at least two kinds of cards to be loaded in the card loading portion and said tray is further provided with a card identification mechanism for identifying the cards to be used. Claim 5 recites the card connector as claimed in claim 1, 2, 3 or 4, wherein said housing is provided with stopper means on the side of the fitting opening for preventing the tray from extending from the housing. Claim 6 recites the card connector as claimed in any one of claims 1 to 5, further comprising a mechanism for drawing said tray to some extent relative to the housing by pushing said tray in the state that said tray has been inserted.

Patent Literature 3

According to the abstract of the Japanese Patent Application No. 2006-115,165, this invention has an object to provide a card connector which is miniaturized and lighter, more compact and simple in construction and is easy to remove a memory card. Disclosed is a card connector 10 into and from which a memory card 60 is detachably inserted and removed, including contacts 14 each adapted to contact a connection portion of the memory card 60, and a housing 12 for arranging and holding the contacts 14 and having an inserting opening 22 for inserting the memory card 60, wherein the housing 12 includes two side walls 24, a rear wall 26, and a lower wall 28 contiguous to these side and rear walls 24 and 26 to form the inserting opening 22 for the memory card 60 by these walls 24, 26 and 28, and a shell 16 is arranged on the side of the housing opposite from the lower wall 28, and an elastically deformable tray 18 is arranged on the lower wall 28 so as to be slidable with the aid of a tray restraining plate 20.

Incidentally, claim 1 recites a card connector into and from which a memory card is detachably inserted and removed, including contacts each adapted to contact a connection portion of the memory card, and a housing for arranging and holding said contacts and having an inserting opening for inserting the memory card, wherein said housing comprises two side walls, a rear wall, and a lower wall contiguous to these side and rear walls to form said inserting opening for said memory card by the two side walls, the rear wall, and the lower wall, and wherein a shell is arranged on the side of the housing opposite from said lower wall, and an elastically deformable tray is arranged on said lower wall so as to be slidable with the aid of a tray restraining plate. Claim 2 recites the card connector as claimed in claim 1, wherein said tray is made of a metal having an elasticity in the form of a plate and comprises at one free end an operating portion extending from the end face of said lower wall when said memory card has been loaded so that said tray is slidably moved by drawing said operating portion. Claim 3 recites the card connector as claimed in claim 1 or 2, wherein said tray comprises erroneous fitting preventing means and positioning means for said memory card. Claim 4 recites the card connector as claimed in any one of claims 1 to 3, wherein said tray is formed as a plate-shaped piece so that a space is provided below the lower surface of said memory card when said tray has been drawn from the housing.

Recently, with the miniaturization of appliances, the need for connectors to be more miniaturized has become stronger, and nowadays even a connector having a height of less than 2 mm is pursued. On the other hand, as the connector becomes lighter and more compact, it would become difficult to insert and remove a memory card into and from the connector. Under such circumstances, the connectors constructed as disclosed in the Patent Literatures 1 to 3 could not realize the miniaturization of the connector such as a height of less than 2 mm owing to the number and thicknesses of parts and structural problems. As a general trend of the technical field, moreover, requirements for improving the safety of operation and preventing erroneous fitting of memory cards have become stronger.

SUMMARY OF THE INVENTION

In view of the problems of the prior art described above, it is an object of the invention to provide a card connector which is simple in construction and superior in safety and achieves a reduced overall height of the card connector of less than 2 mm, and it is another object to provide a method for producing a housing assembly consisting of contacts, metal plates and a housing integrally formed as a unitary structure.

The above object can be achieved by a card connector 10 into and from which a memory card 60 is detachably inserted and removed, including contacts 14 adapted to contact connection portions of the memory card 60, and a housing 12 for arranging and holding said contacts 14, wherein metal plates 16 made of a metal are mounted in said housing 12 so as to extend onto both sides in the width direction of the housing 12, said metal plates 16 integrally provided with connection portions 163 to be connected to a substrate, and a tray 18 made of a metal is provided for loading a plurality of memory cards 60 therein, either of both ends of said tray 18 in its width direction being bent substantially into an L-shape, which bent portion 26 slidably engages said metal plate 16 to allow metal-to-metal sliding coupling.

In the case of a tray in which a single memory card is loaded, the object described above can be accomplished by a card connector 10 into and from which a memory card 60 is detachably inserted and removed, including contacts 14 adapted to contact connection portions of the memory card 60, and a housing 12 for arranging and holding said contacts 14, wherein said housing 12 is provided with extending portions 24 extending onto both sides in its width direction, and a tray 18 made of a metal is provided for loading one memory card 60 therein, either of both ends of said tray 18 in its width direction being bent substantially into an L-shape, which bent portion 26 slidably engages said extending portion 24 to allow metal-to-metal sliding coupling.

In the card connector 10 claimed in claim 3, the extending portions 24 of said housing 12 are made of metal plates 16 separate from said housing 12, and said metal plates 16 are integrally provided with connection portions 163 to be connected to a substrate.

In the card connector 10 claimed in claim 4, moreover, said tray 18 is attached with a button 22 made of a resin mounted thereon on either of both sides in the width direction and at the other end opposite to the end bent into the L-shape.

In the card connector 10 claimed in claim 5, said metal plates 16 or said extending portions 24 are provided with projections 30 on the side of insertion of the tray on both sides in the width direction, respectively, and said tray 18 is provided on its side faces 34 with anchoring grooves 28, respectively, with which said projections 30 are in slidable engagement.

In the card connector 10 claimed in claim 6, further, a housing assembly 20 is used which is integrally formed with said contacts 14 and said metal plates 16.

In the card connector 10 claimed in claim 7, said side faces 34 of said tray 18 on both the sides in the width direction are provided at their free ends with folded-back portions 38, respectively.

A method for producing said housing assembly 20 according to the invention comprises successively performing steps of forming a subassembly 21 by press-working said contacts 14 and said metal plate 16 into an integral predetermined shape as a first step, integrally molding said housing 12 with the subassembly 21 formed in the first step after the subassembly 21 has been set in a metal mold as a second step, and cutting connecting portions between said contacts 14 and said metal plate 16 of the integrally molded product in said second step, as a third step.

As can be seen from the above description, the card connector and the method for producing a housing assembly according to the invention bring about the following significant functions and effects.

(1) In the card connector 10 into and from which a memory card 60 is detachably inserted and removed, including contacts 14 adapted to contact connection portions of the memory card 60, and a housing 12 for arranging and holding said contacts 14, according to the invention metal plates 16 made of a metal are installed in said housing 12 so as to extend onto both sides in the width direction of the housing 12, said metal plates 16 integrally provided with connection portions 163 to be connected to a reference potential (not shown), and a tray 18 made of a metal is provided for loading a plurality of memory cards 60 therein, either of both ends of said tray 18 in its width direction being bent substantially into an L-shape, which bent portion 26 slidably engages said metal plate 16 to allow metal-to-metal sliding coupling. Therefore, it is possible to achieve a reduced overall height of the card connector of less than 2 mm, and shielding, and preparation for static electricity can be easily performed by merely inserting a memory card into the card connector.

(2) In the case of a tray in which a single memory card is loaded, in the card connector 10 into and from which a memory card 60 is detachably inserted and removed, including contacts 14 adapted to contact connection portions of the memory card 60, and a housing 12 for arranging and holding said contacts 14, according to the invention said housing 12 is provided with extending portions 24 extending onto both sides in its width direction, and a tray 18 made of a metal is provided for loading one memory card 60 therein, either of both ends of said tray 18 in its width direction being bent substantially into an L-shape, which bent portion 26 slidably engages said extending portion 24 to allow metal-to-metal sliding coupling. Consequently, it is possible to achieve a reduced overall height of the card connector of less than 2 mm.

(3) In the card connector 10 claimed in claim 3, the extending portions 24 of said housing 12 are made of metal plates 16 separate from said housing 12, and said metal plates 16 are integrally provided with connection portions 163 to be connected to a substrate. Therefore, it is possible to achieve a reduced overall height of the card connector of less than 2 mm, and shielding, and preparation for static electricity can be easily performed by merely inserting a memory card into the card connector.

(4) In the card connector 10 claimed in claim 4, said tray 18 is provided with a button 22 made of a resin mounted thereon on either of both sides in the width direction and at the other end opposite to the end bent into the L-shape. Accordingly, said tray 18 can be safely handled.

(5) In the card connector 10 claimed in claim 5, said metal plates 16 or said extending portions 24 are provided with projections 30 on the side of insertion of the tray on both sides in the width direction, respectively, and said tray 18 is provided on its side faces 34 with anchoring grooves 28, respectively, with which said projections 30 are in slidable engagement. Consequently, the engagement of the projections 30 with said anchoring grooves 28 not only provides an effective guide at the sliding movement of the tray to keep it in a stable condition, but also serves to limit the movement of the tray 18.

(6) In the card connector 10 claimed in claim 6, a housing assembly 20 is used which is integrally formed with said contacts 14 and said metal plates 16. Therefore, it is possible to achieve a reduced overall height of the card connector of less than 2 mm.

(7) In the card connector 10 claimed in claim 7, said side faces 34 of said tray 18 on both the sides in the width direction are provided at their free ends with folded-back portions 38, respectively. Consequently, fingers are completely prevented from being injured even if a person directly contacts said tray 18 made of a metal.

(8) A method for producing said housing assembly 20 comprises successively performing steps of forming a subassembly 21 by press-working said contacts 14 and said metal plate 16 into an integral predetermined shape as a first step, integrally molding said housing 12 with the subassembly 21 formed in the first step after the subassembly 21 has been set in a metal mold as a second step, and cutting connecting portions between said contacts 14 and said metal plate 16 of the integrally molded product in said second step, as a third step. Therefore, this method can produce said housing assembly 20 in a simple manner and leads to a reduced overall height of the card connector of less than 2 mm.

The invention will be more fully understood by referring to the following detailed specification and claims taken in connection with the appended drawings.

DESCRIPTION OF THE PREFERRED EMBODIMENTS

Figure 1A:
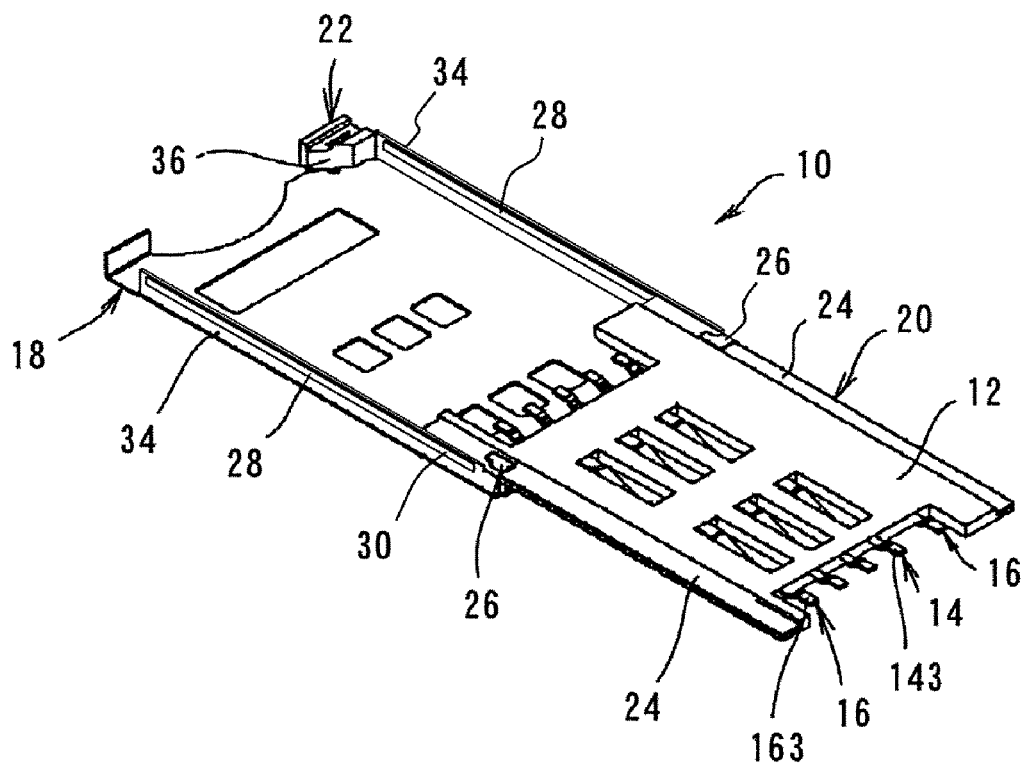
FIG. 1A is a perspective view of the card connector with a tray drawn, viewed from the fitting side.
Figure 1B:
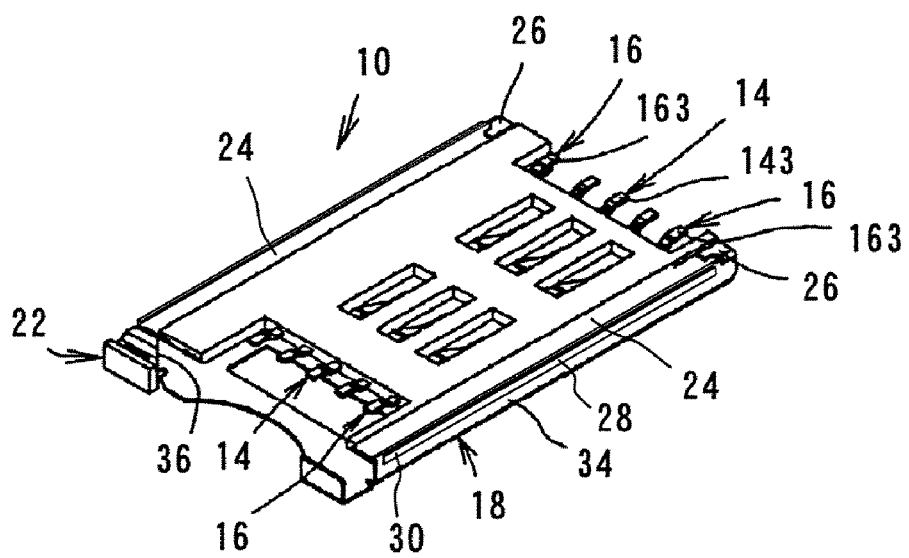
FIG. 1B is a perspective view of the card connector with the tray inserted, viewed from the fitting side.
Figure 2A:
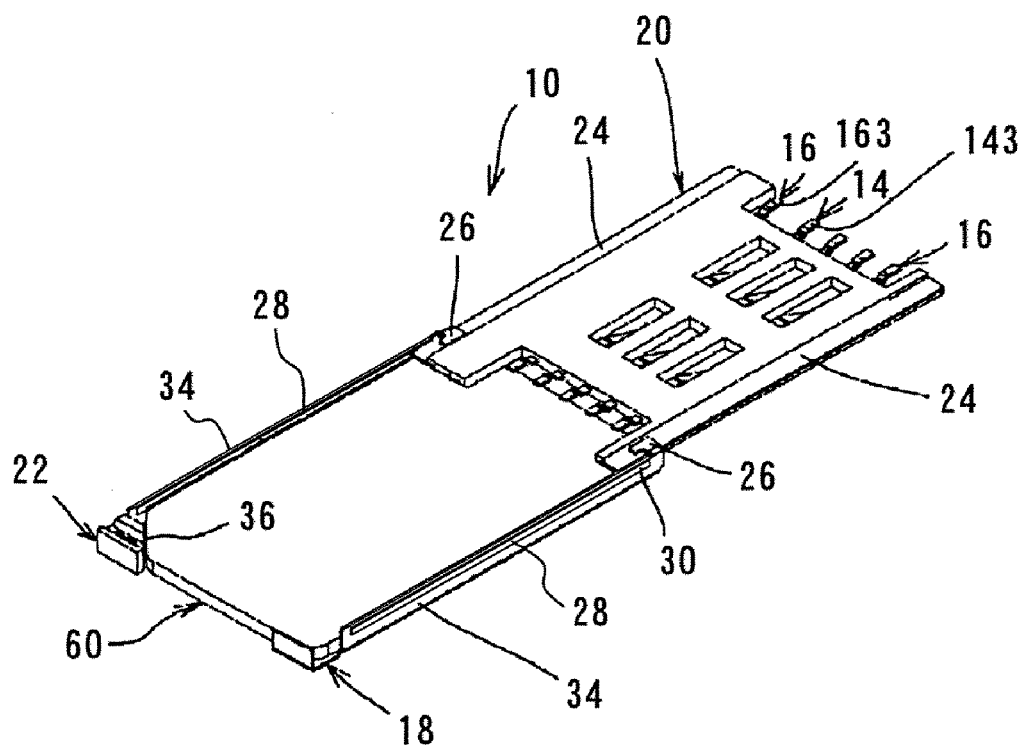
FIG. 2A is a perspective view of the card connector with the tray drawn and a card loaded, viewed from the fitting side.
Figure 2B:
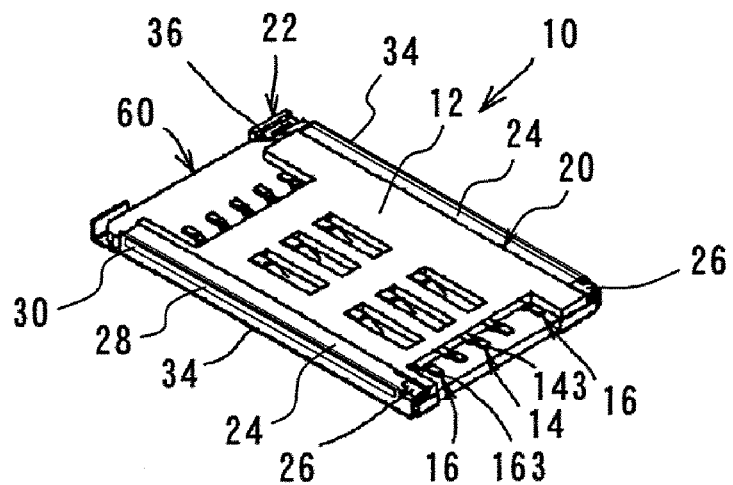
FIG. 2B is a perspective view of the card connector with the tray inserted together with the card loaded therein, viewed from the fitting side.
Figure 3:
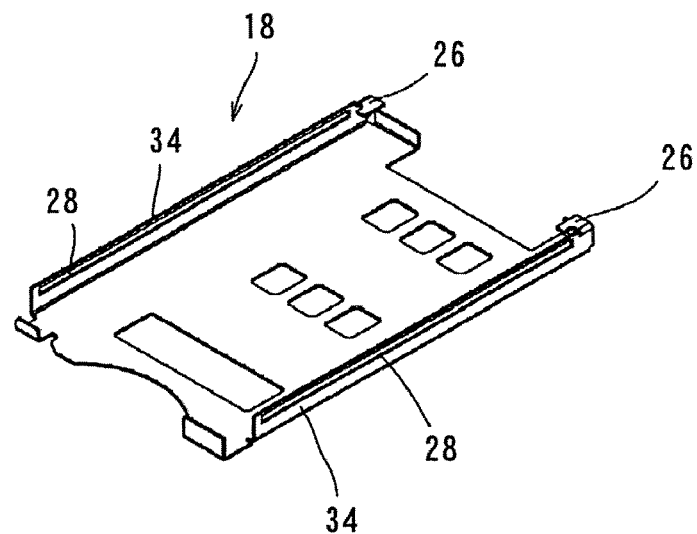
FIG. 3 is a perspective view of the tray.
Figure 4:
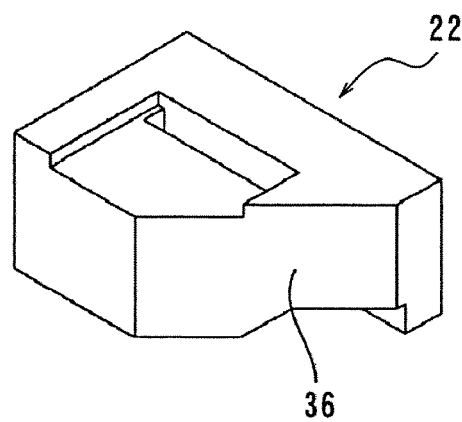
FIG. 4 is a perspective view of a button.
Figure 5:
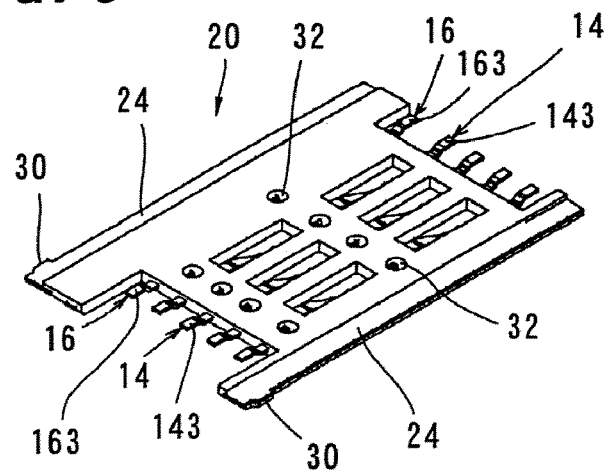
FIG. 5 is a perspective view of a housing integrally holding contacts and a metal plate.
Figure 6A:
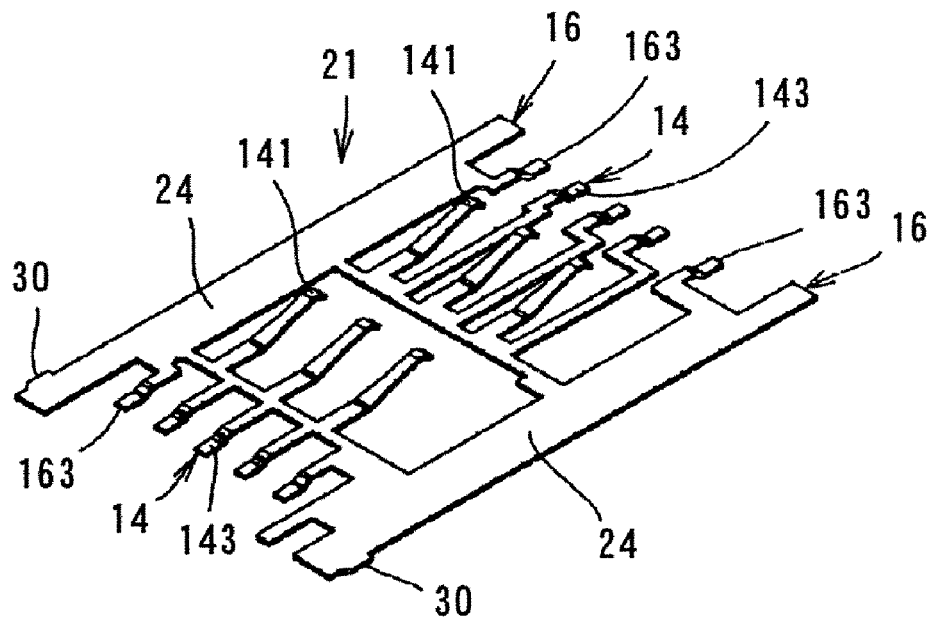
FIG. 6A is a perspective view of a subassembly consisting of the contacts and a metal plate formed as one or integral unit.
Figure 6B:
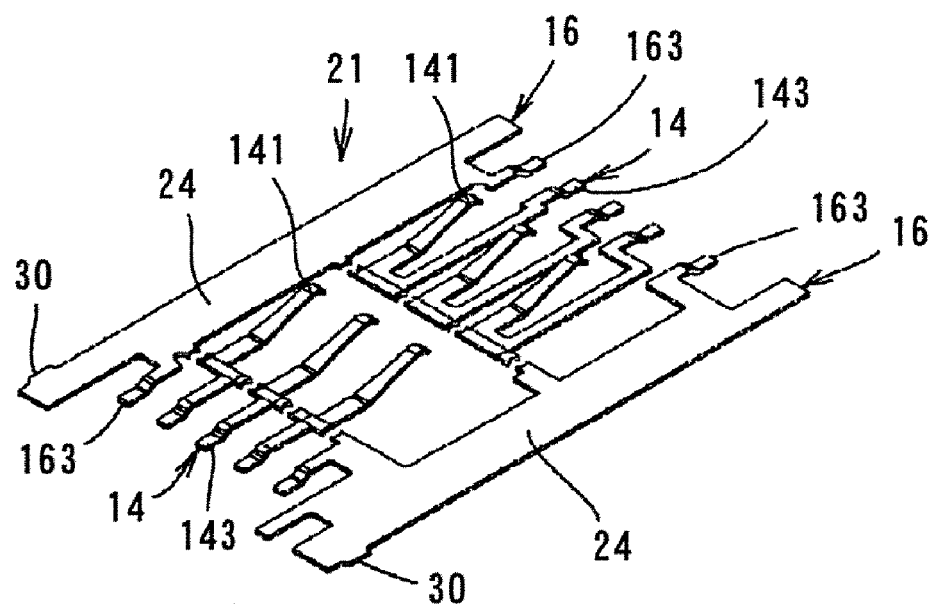
FIG. 6B is a perspective view of the separated contacts and the metal plates.
Figure 6C:
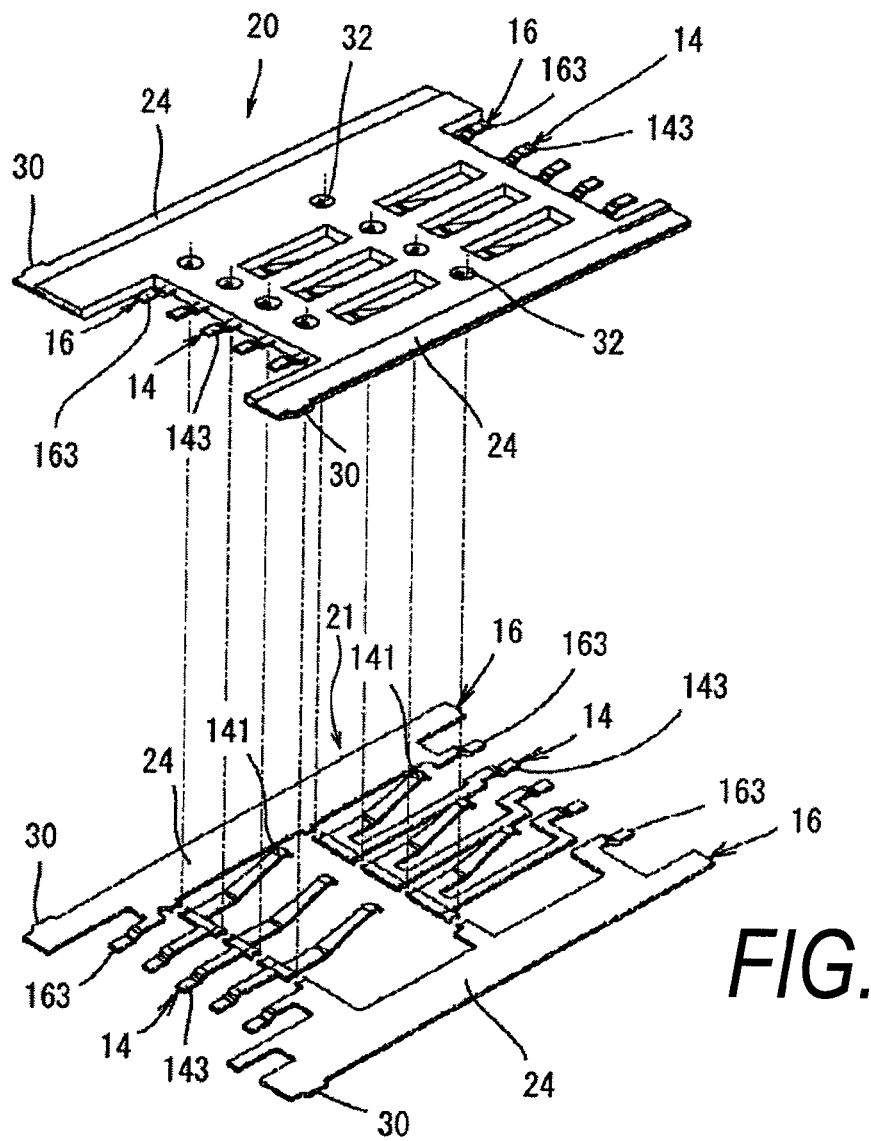
FIG. 6C is a perspective view showing how holes in the housing line up with the cutting position of the metal parts assembly.
Figure 7A:
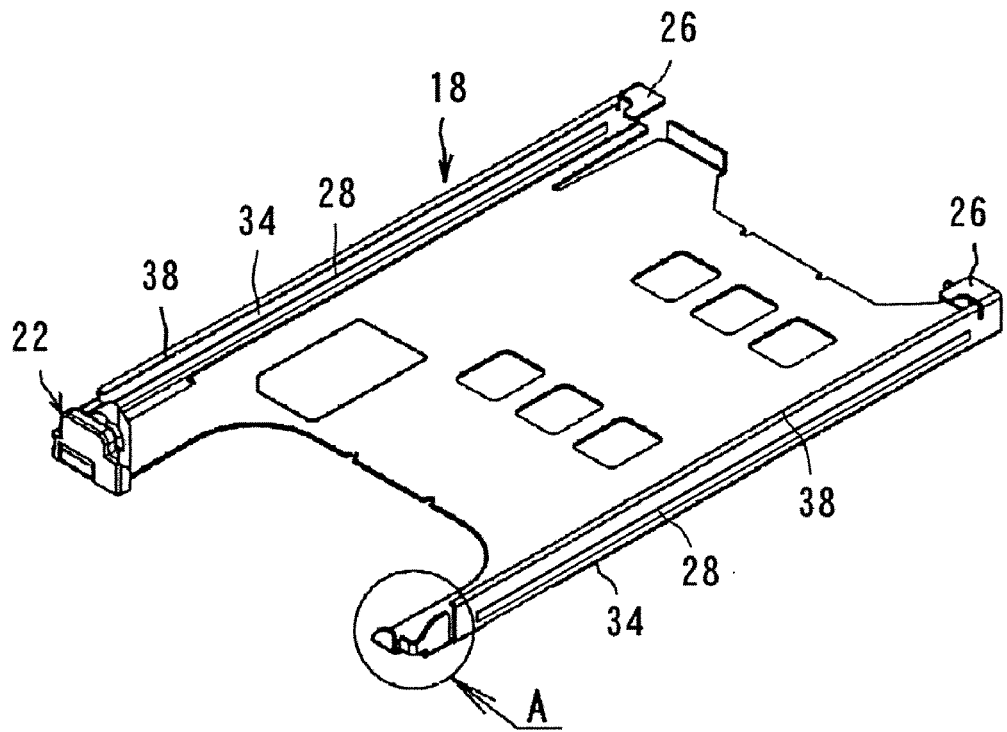
FIG. 7A is a perspective view of a tray different from the tray shown in FIG. 3, with the button installed thereon.
Figure 7B:
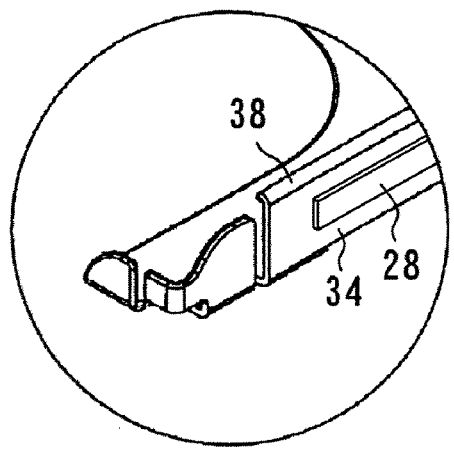
FIG. 7B is a partly enlarged view of the encircled portion A in FIG. 7A.

One embodiment of the card connector according to the invention will be explained with reference to FIGS. 1A to 7B. FIG. 1A is a perspective view of the card connector with a tray drawn, viewed from the fitting side, and FIG. 1B is a perspective view of the card connector with the tray inserted, viewed from the fitting side. FIG. 2A is a perspective view of the card connector with the tray drawn and a card loaded, viewed from the fitting side, while FIG. 2B is a perspective view of the card connector with the tray inserted together with the card loaded therein, viewed from the fitting side. FIG. 3 is a perspective view of the tray. FIG. 4 is a perspective view of a button. FIG. 5 is a perspective view of a housing integrally holding contacts and a metal plate. FIG. 6A is a perspective view of the contacts and a metal plate formed as one or integral unit, and FIG. 6B is a perspective view of the contacts and the metal plates, separated. FIG. 7A is a perspective view of a tray different from the tray shown in FIG. 3, with the button installed thereon, while FIG. 7B is a partly enlarged view of the encircled portion A in FIG. 7A.

The card connector 10 of one embodiment according to the invention mainly comprises a housing 20 (a housing integrally molded with integrally formed contacts 14 and metal plates 16), a tray 18, and a button 22.

Before explaining the components of the card connector, the cards will be explained. Said cards are used for printers, card readers and the like. Said cards each mainly comprise contact portions adapted to contact the contact portions 141 of the contacts 14, patterns connecting from the contact portions of the card to circuits, and connection portions adapted to be connected to integrated circuits and central processing units mounted on the patterns. Cards to be used for the card connector 10 according to the invention include SIM card (Subscriber Identity Module card, registered trademark), Multimedia card (registered trademark), SD card (Secure Digital memory card, registered trademark), Mini-SD card (Mini Secure Digital memory card, registered trademark), Memory Stick card (registered trademark), SmartMedia card (registered trademark), CompactFlash card (registered trademark), xD card (registered trademark), RS-MMC card (Reduce Size MMC card, registered trademark), Transflash card (registered trademark), S card (registered trademark), Memory-stick Duo card (registered trademark) and the like. These IC cards have built-in CPU or IC for memory.

The card connector 10 of the illustrated embodiment is so constructed that the SIM card (registered trademark) can be inserted.

The method for producing the housing 20 will be explained at the beginning, which is essential for achieving a reduced overall height of the connector. The method for producing the housing 20 may be effected by successively performing the following first to third steps.

As a first step, said contacts 14 and said metal plates 16 are formed from a metal plate by press-working to an integral or unitary predetermined shape, thereby forming a subassembly 21 as shown in FIG. 6A.

As a second step, after the subassembly 21 formed in the first step has been set in a metal mold, a housing is integrally molded in the metal mold together with the subassembly 21 to form a housing assembly.

As a third step, connecting portions between the contacts 14 and the metal plates 16 of the housing assembly formed in the second step are cut off. As a result, said contacts 14 and said metal plate 16 are disconnected as shown in FIG. 6B which illustrates a state that the insulator or housing is eliminated. In other words, by forming the holes 32 in the insulator, said contacts 14 and said metal plate 16 are disconnected and at the same time the contacts themselves are also disconnected from one another into six contacts and the metal plate is disconnected or separated into two metal plates in the illustrated embodiment as shown in FIG. 5 in the state that the contacts 14 and the metal plates 16 are covered by the insulator or housing. Dotted lines in FIG. 6C show how the holes 32 line up with the cutting positions of the subassembly 21.

First, the subassembly (the integrally formed contacts 14 and metal plates 16) will be explained. The subassembly 21 is made of a metal and formed by means of the press-working of the known technique. Preferred metals from which to form said subassembly 21 include brass, beryllium copper, phosphor bronze and the like which comply with the requirements as to electric conductivity, dimensional stability, formability, springiness, and the like.

The contacts 14 and metal plates 16 as respective parts will be explained with reference to FIGS. 6A and 6B. Said contacts 14 each mainly comprise a contact portion 141 adapted to contact a connection portion of a memory card, and a connection portion 143 to be connected to a substrate. Said contacts 14 are commensurate with the SIM card (registered trademark) 60, and the connection portions of the contacts 14 may be suitably designed in consideration of circuit design and occupied area of the substrate, and size and design of the connector 10. The contacts 14 are arranged such that their connection portions 143 extend in both the directions, that is, in the inserting direction of the tray and in the opposite direction thereto. The connection portions 143 are of a surface mounting type (SMT) as shown in FIGS. 1A and 1B.

Moreover, the contact portion 141 of the contact 14 is curved so as to come into contact with the inserted memory card 60 with ease. The position of the contact portion 141 may be suitably designed in consideration of the respective position of the connection portion of the inserted memory card 60. The size of the curved portion of the contact portion 141 may be suitably designed in consideration of the contact pressure on the memory card 60.

Said metal plates 16 each mainly comprise an extending portion 24 extending in the width direction of said housing 12, and connection portions 163 to be connected to the substrate. Said metal plates 16 have functions of shielding and discharging any static electricity when contacting the tray. The connection portions 163 of said metal plates 16 may be suitably designed in consideration of the circuit design and occupied area of the substrate and the size and design of the connector 10. In the illustrated embodiment, said metal plates 16 are arranged such that their connection portions 163 extend in both the inserting direction of said tray and the direction opposite thereto. The connection portions 163 are of a surface mounting type (SMT) as shown in FIGS. 1A and 1B.

The subassembly 21 is formed by integrally or unitarily forming said contacts 14 and said metal plates 16. In the illustrated embodiment, said subassembly 21 consists of the six contacts 14 and two metal plates 16.

Although said extending portions 24 are formed by said metal plates 16 in the illustrated embodiment, said extending portions 24 may be formed by the metal plate 16 and said housing 12 (said metal plates 16 may be arranged above the housing as the case may be), or said extending portions 24 may be formed only by said housing 12 without using the metal plates 16.

Said extending portions 24 are each provided with a projection 30 on the side of the insertion of the tray so that the projections 30 extend on both the sides in the width direction. Said projections 30 engage anchoring grooves 28 provided on side faces 34 of said tray 18. The engagement of said projections 30 with said anchoring grooves 28 not only provides a guide for stable sliding movement of the tray, but also serves to limit the movement of the tray. Moreover, said tray 18 is being drawn by a strong force, under the influence of which the tray 18 may often jump out of its course. Such a risk can be avoided by the engagement of the projections 30 with the anchoring grooves 28. The size of said projections 30 may be suitably designed in consideration of the strength, slidability and the like of said tray 18.

Said subassembly 21 will then be explained. As described above, after said housing assembly has been set in the metal mold, the housing is molded in the metal mold so that the housing is integrally molded with said subassembly 21, thereby forming the housing assembly. In other words, said contacts 14, said metal plates 16, and the housing 12 are formed into an integral or unitary body. The insulator portion (housing 12) is formed from an electrically insulating plastic material by means of the injection molding of the known technique. The materials for the insulator portion (housing 12) may be suitably selected in consideration of dimensional stability, workability, manufacturing cost, and the like and generally include polybutylene terephthalate (PBT), polyamide (66PA or 46PA), liquid crystal polymer (LCP), polycarbonate (PC) and the like and combination thereof.

The housing assembly as a final product is formed with the holes 32 for electrically disconnecting between said contacts 14 and said metal plate 16. Said holes 32 are formed by drilling said housing assembly set in a predetermined metal die, thereby electrically disconnecting said contacts 14 from said metal plate 16. The positions of said holes 32 correspond to the connection portions between the contacts 14 and said metal plates 16.

The tray 18 will then be explained, which is one important aspect of the invention. The tray 18 is made of a metal in the illustrated embodiment, and formed by means of the press-working of the known technique. Preferred metals from which to form said tray 18 include brass, beryllium copper, phosphor bronze and the like which comply with the requirements as to electric conductivity, dimensional stability, formability, springiness, and the like.

Said tray 18 serves to hold the memory card, and to insert and remove the memory card into and from the card connector 10 by inserting and removing the tray 18 into and from said housing assembly 20. Said tray 18 has a substantially U-shaped cross-section and includes bent portions 26 at both ends in its width direction. The bent portions 26 are bent in the direction opposite to the inserting direction of the tray 18. Said bent portions 26 are adapted to contact and engage the extending portions 24 of said housing assembly 20, respectively, so as to slide on said extending portions 24. The shape of said bent portions 26 need only be able to contact the extending portions 24 and slide thereon and may be suitably designed in consideration of strength, slidability, conductivity, workability and the like.

The side faces 34 of said tray 18 are each provided with the anchoring groove 28 adapted to engage said projection 30. The engagement of said projections 30 with said anchoring grooves 28 not only provides a guide for stable sliding movement of the tray, but also serves to limit the movement of the tray. Moreover, said tray 18 is being drawn by a strong force, under the influence of which the tray 18 may often jump out of its course. Such a risk can be avoided by the engagement of the projections 30 with the anchoring grooves 28. Said anchoring grooves 28 extend substantially over the full length of the side faces 34, respectively. The size of said anchoring grooves 28 may be suitably designed in consideration of the strength, slidability and the like of said tray 18.

As said tray 18 is for loading said memory card 60 therein, the tray 18 is provided with the upright portions surrounding said memory card, such as said side faces 34.

In order to prevent fingers of a person from being injured upon the fingers touching said tray made of a metal, moreover, it is preferable to provide folded-back portions 38 at free ends of said side faces 34 of said tray 18 on both the sides in its width direction as shown in FIGS. 7A and 7B. However, the folded-back portions 38 must necessarily be provided so as not to adversely affect the sliding movement of the tray on said housing assembly 20. The volume of the folded-back portions 38 need only fulfill the above requirements, and the free ends of the upright portions need only be folded back in any way without any facture surfaces remained. The shape and size of the folded-back portions may be suitably designed so as to fulfill the above requirements. In the illustrated embodiment, there are provided the folded-back portions of the order of 0.05 to 0.1 mm.

A tray 18 in which a plurality of memory cards are loaded will be explained herein. Differences from the tray 18 (in which a single memory card is loaded described above) only will be described. It is required to separate memory cards from one another by insulators in order to load the plurality of memory cards in a tray. Therefore, partition members made of an insulating material are fixed to a tray 18 by press-fitting, welding, or the like. The partition members may be suitably designed depending upon sizes of memory cards to be loaded. The thickness of the partition members between the cards is of the order of 0.5 mm.

In view of manufacturing efficiency, strength of the partition members, management cost, it is desirable to form the partition members together with a button 22 described below and the metal tray 18 as an integral or unitary member.

Finally, the button 22 will be explained. Said button 22 is formed from an electrically insulating plastic material by means of the injection molding of the known technique. The materials for the button 22 may be suitably selected in consideration of dimensional stability, workability, manufacturing cost, and the like and generally include polybutylene terephthalate (PBT), polyamide (66PA or 46PA), liquid crystal polymer (LCP), polycarbonate (PC) and the like and combination thereof.

Said button 22 serves to protect a person handling said tray 18 from being injured by the tray 18 made of a metal. Moreover, said button 22 is provided with an inclined portion 36 which prevent an erroneous fitting of a memory card or a wrong memory card from being inserted. Position and shape of the button 22 are suitably designed in consideration of easy handling, erroneous fitting prevention, and the like. In the illustrated embodiment, the button 22 is provided on one end of said tray 18 opposite to the end provided with the bent portion 26. The button 22 is fixed to the tray by press-fitting, welding, integral forming, or the like.

Although the card connector 10 has been shown and explained, having the structure into which the SIM card (registered trademark) 60 can be inserted, needless to say, constructions similar to that described above according to the invention are also applicable to connectors for memory cards other than the SIM card.

Examples of applications of the present invention include card connectors being capable of exchanging signals between the connector and a memory card inserted therein for use in various electric and electronic appliances such as mobile phones, personal digital assistants (PDA), printers, card readers and the like, and particularly card connectors with a structure which achieves a reduced overall height of the connector and is superior in safe operationality.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A card connector into and from which a memory card is detachably inserted and removed, comprising contacts adapted to contact connection portions of the memory card, and a housing for arranging and holding said contacts, wherein metal plates are mounted in said housing so as to extend onto both sides in the width direction of the housing, said metal plates integrally provided with connection portions to be connected to a reference potential, and a tray made of a metal is provided for loading one of a plurality of memory cards therein, both ends of said tray in its width direction being bent substantially into an L-shape, which bent portion slidably engages said metal plate to allow metal-to-metal sliding coupling.

2. A card connector into and from which a memory card is detachably inserted and removed, comprising contacts from a subassembly adapted to contact connection portions of the memory card, and a housing for arranging and holding said contacts, wherein said housing is provided with extending portions made of metal plates separate from said housing, extending onto both sides in its width direction, and wherein said contacts form said subassembly and said extending portions of said housing are integrally formed and integrally molded to form a housing assembly, and wherein the connecting portions between said contacts and said metal plates are cut apart, and a tray made of a metal is provided for loading one memory card therein, both ends of said tray in its width direction being bent substantially into an L-shape, which bent portion slidably engages said extending portion to allow metal-to-metal sliding coupling.

3. The card connector as set forth in claim 2, wherein said metal plates are integrally provided with connection portions to be connected to a reference potential.

4. The card connector as set forth in any one of claims 1, 2 and 3, wherein said tray is attached with a button to prevent erroneous insertion of said memory card and said button is made of a resin mounted thereon on either of both sides in the width direction and at the other end opposite to the end bent into the L-shape.

5. The card connector as set forth in claim 1, wherein said metal plates are provided with projections on the side of insertion of the tray on both sides in the width direction, respectively, and said tray is provided on its side faces with anchoring grooves, respectively, with which said projections are in slidable engagement to fix the location.

6. The card connector as set forth in claim 1 or 3, wherein said housing is used which is integrally formed with said contacts and said metal plates.

7. The card connector as set forth in claim 5, wherein said side faces of said tray on both the sides in the width direction are provided at their free ends with folded-back portions, respectively.

8. A method for producing a connector housing comprising:
forming a subassembly by press-working a flat metal piece into an integral predetermined shape with contacts and metal plates,
integrally molding said subassembly with a housing after said subassembly has been set in a metal mold to form a housing assembly, wherein metal plates are mounted in said housing assembly so as to extend onto two sides of the housing, said metal plates integrally provided with at least one connection portion for connection to a reference potential, and
cutting connecting portions between said contacts and said metal plates of the the housing assembly by one-step drilling.

9. The card connector as set forth in claim 4, wherein said side faces of said tray on both the sides in the width direction are provided at their free ends with folded-back portions, respectively.

10. The card connector as set forth in claim 5, wherein said side faces of said tray on both the sides in the width direction are provided at their free ends with folded-back portions, respectively.

11. The card connector as set forth in claim 6, wherein said side faces of said tray on both the sides in the width direction are provided at their free ends with folded-back portions, respectively.

12. The card connector as set forth in claim 2 or 3, wherein said extending portions are provided with projections on the side of insertion of the tray on both sides in the width direction, respectively, and said tray is provided on its side faces with anchoring grooves, respectively, with which said projections are in slidable engagement to fix the location.

13. The card connector as set forth in claim 6, wherein said side faces of said tray on both the sides in the width direction are provided at their free ends with folded-back portions, respectively.

14. A method for producing a connector housing comprising:
forming a subassembly by press-working a flat metal piece into an integral predetermined shape with contacts and metal plates,
integrally molding said subassembly with a housing after said subassembly has been set in a metal mold to form a housing assembly, wherein said housing is provided with extending portions made of metal plates separate from said housing, extending onto two sides of the housing, and
cutting at least one connecting portion between the contacts and the metal plates of the integrally molded product by one-step drilling.

* * * * *